United States Patent
Feraud et al.

(10) Patent No.: US 10,697,498 B2
(45) Date of Patent: Jun. 30, 2020

(54) ASSEMBLY FOR AN EPICYCLIC REDUCTION GEARSET COMPRISING AT LEAST ONE SATELLITE BEARING COMPRISING LUBRICATION MEANS

(71) Applicant: SAFRAN TRANSMISSION SYSTEMS, Colombes (FR)

(72) Inventors: Benjamin Feraud, Saint-Vincent (FR); Aissa Benykhlef, Pfaffikon (CH); Patrice Gedin, Bezons (FR); Guillaume Julien Beck, Chantilly (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 58 days.

(21) Appl. No.: 16/074,039

(22) PCT Filed: Jan. 20, 2017

(86) PCT No.: PCT/FR2017/050117
§ 371 (c)(1),
(2) Date: Jul. 30, 2018

(87) PCT Pub. No.: WO2017/134358
PCT Pub. Date: Aug. 10, 2017

(65) Prior Publication Data
US 2019/0040908 A1    Feb. 7, 2019

(30) Foreign Application Priority Data
Feb. 1, 2016   (FR) ...................................... 16 50786

(51) Int. Cl.
*F16H 57/04*    (2010.01)
*F16C 33/58*    (2006.01)
(Continued)

(52) U.S. Cl.
CPC .......... *F16C 33/581* (2013.01); *F16C 33/586* (2013.01); *F16C 33/60* (2013.01);
(Continued)

(58) Field of Classification Search
CPC .... F16C 33/581; F16C 33/60; F16C 33/6674; F16C 33/6677; F16C 19/38
See application file for complete search history.

(56) References Cited

U.S. PATENT DOCUMENTS 5,106,209 A * 4/1992 Atkinson ................ F16C 33/60
                                                    384/462
9,121,491 B2 * 9/2015 Hancox ................... F01D 25/18
(Continued)

FOREIGN PATENT DOCUMENTS

EP    2719927 A1    4/2014
FR    3015599 A1    6/2015

OTHER PUBLICATIONS

Written Opinion received for PCT Patent Application No. PCT/FR2017/050117, dated Apr. 11, 2017, 5 pages of Original Document Only.
(Continued)

*Primary Examiner* — David R Morris
(74) *Attorney, Agent, or Firm* — Womble Bond Dickinson (US) LLP

(57) ABSTRACT

An assembly for an epicyclic reduction gearset, including a satellite carrier, satellites, and at least one satellite bearing including a central axis linked to the satellite carrier. An inner ring mounted on the central axis, an outer ring mounted to rotate around the central axis. A lubrication circuit brings a flow of oil between the rings. The lubrication circuit includes a first portion supplied with oil with openings to the outside of the inner ring in a radially inner area of the bearing. A second portion has openings to the outside
(Continued)

of the inner ring. An intermediate portion has at least one channeling connecting the first portion to the second portion, having at least one singular pressure reduction formed by an elbow and at least one flattening of a transverse cross-section. The central axis has a radially outer first surface. The inner ring has a radially inner second surface.

8 Claims, 3 Drawing Sheets

(51) Int. Cl.
*F16C 33/66* (2006.01)
*F16C 33/60* (2006.01)
*F16C 19/38* (2006.01)
*F16C 23/08* (2006.01)

(52) U.S. Cl.
CPC ...... *F16C 33/6674* (2013.01); *F16C 33/6677* (2013.01); *F16H 57/0482* (2013.01); *F16C 19/38* (2013.01); *F16C 23/086* (2013.01); *F16C 2360/23* (2013.01); *F16C 2361/61* (2013.01)

(56) References Cited

U.S. PATENT DOCUMENTS

| | | | |
|---|---|---|---|
| 9,382,945 B2* | 7/2016 | Doki-Thonon | F16C 33/6677 |
| 10,174,635 B2* | 1/2019 | Walker | F01D 25/16 |
| 2014/0106922 A1* | 4/2014 | Hancox | F01D 25/18 |
| | | | 475/159 |
| 2015/0176645 A1* | 6/2015 | Doki-Thonon | F16C 33/6677 |
| | | | 384/392 |
| 2016/0003100 A1* | 1/2016 | Walker | F16C 33/6677 |
| | | | 415/116 |

OTHER PUBLICATIONS

International Search Report received for PCT Patent Application No. PCT/FR2017/050117, dated Apr. 11, 2017, 6 pages (2 pages of English Translation and 4 pages of Original Document).

* cited by examiner

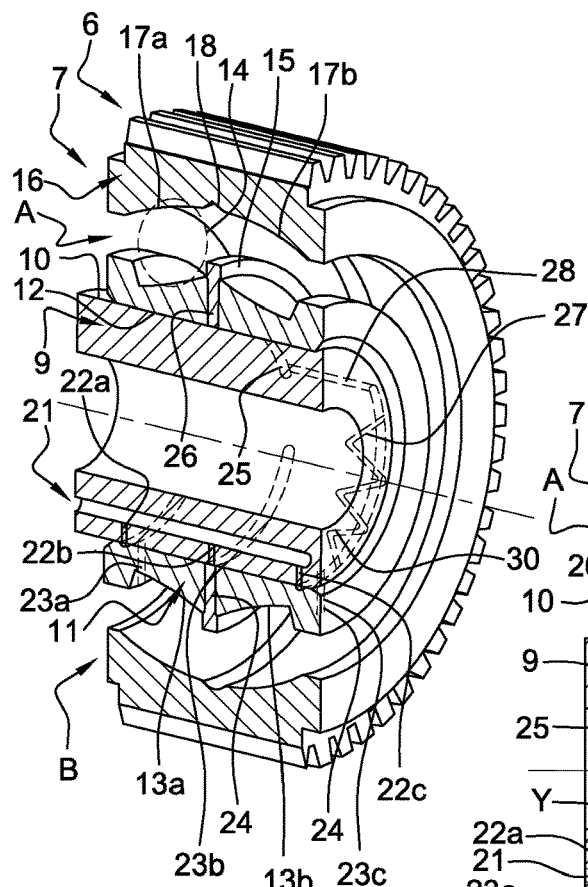
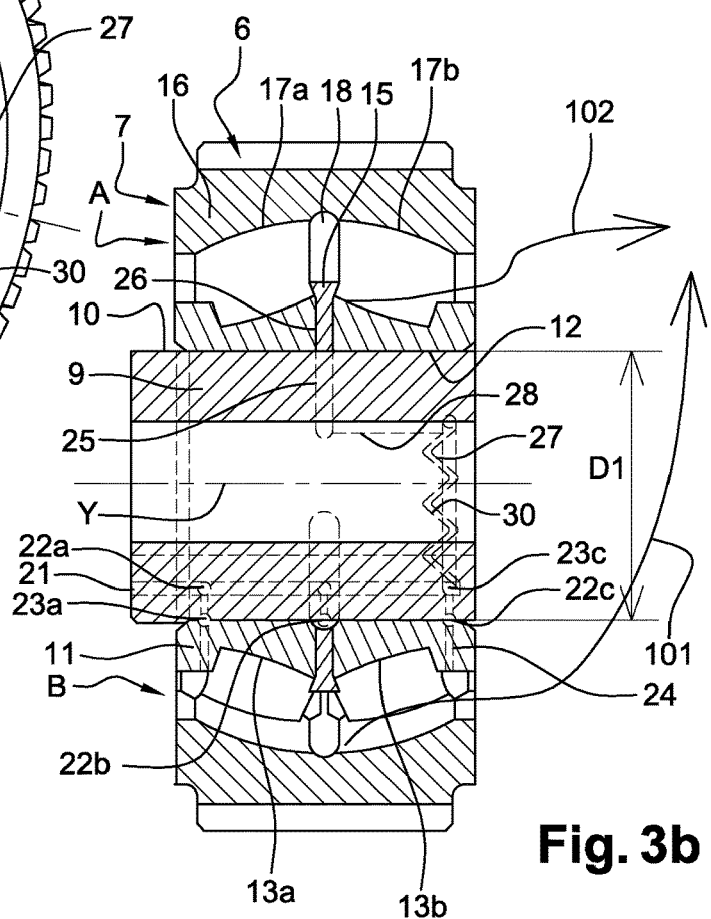
Fig. 3a
Fig. 3b
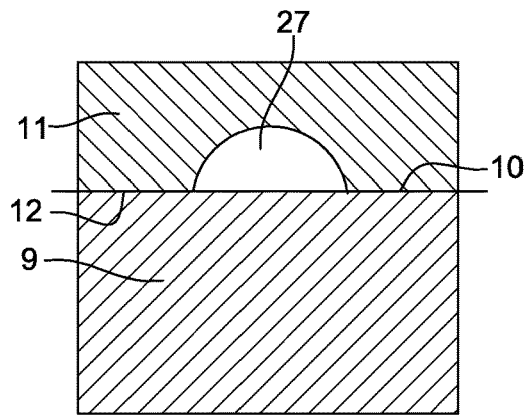
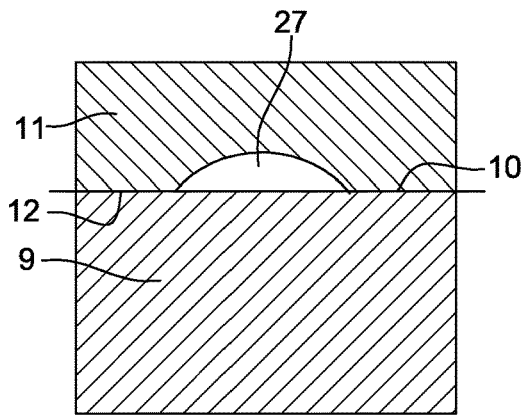
Fig. 4a  Fig. 4b

US 10,697,498 B2

ASSEMBLY FOR AN EPICYCLIC REDUCTION GEARSET COMPRISING AT LEAST ONE SATELLITE BEARING COMPRISING LUBRICATION MEANS

FIELD OF THE INVENTION

This invention relates to the field of bearings of elements rotating on a part itself set into rotation about an axis offset with respect to said bearings, especially satellite bearings in an epicyclic reduction gearset of a turbomachine. It more particularly relates to lubrication devices for roller bearings of said bearings.

PRIOR ART

A by-pass turbomachines, especially those having a high dilution rate, can generally comprise an epicyclic reduction gearset to drive the fan. Schematically, such a turbomachine comprises a fan placed generally in front of the engine portion of the turbomachine, which successively comprises a gas generator and a power turbine. The epicyclic reduction gearset has for purpose to transform the so-called "fast" rotation speed of the shaft of the power turbine into a slower rotation speed for the shaft driving the fan.

For this, in reference to FIG. 1, an example of an epicyclic reduction gearset 1 comprises, with respect to the longitudinal axis X of the turbomachine about which rotates the shaft 2 of the power turbine and the shaft 3 of the fan:
- a sun gear 4, in the form of a gear wheel which is mounted by a splined connection on the turbine shaft 2, rotating in a direction of rotation by driving the reduction gear,
- a satellite carrier 5 integral with the shaft 3 of the fan, whereon satellites 6 (of which three are shown arranged here at 60° from one another) are mounted by bearings 7, in such a way as to rotate around axes Y parallel to the longitudinal axis X and linked to the satellite carrier 5, the satellites 6 being formed by gear wheels meshing around the sun gear 4, and
- an external crown gear 8, which meshes with the satellites 6 and which, here, is maintained fixed with respect to the structure of the turbomachine.

In reference to FIG. 2, where a single satellite 6 is schematically shown, during the operation of the turbomachine, the sun gear 4 is driven at a determined rotation speed $\omega_1$ by the turbine shaft 2. By meshing both on the sun gear 4 in rotation and on the fixed external crown 8, the satellites 6 are put into rotation at a speed $\omega_2$ around the straight line Y at the centre of the bearing 7 thereof and drives the satellite carrier 5, shown in FIG. 2 by the hub that supports the bearing 7, in a rotation at a speed $\omega_3$ about the axis X. The rotation speeds $\omega_2$ of the satellites 6 and the reduction radio between the rotation speed $\omega_3$ of the satellite carrier 5 and that $\omega_1$ of the sun gear 4, are determined in particular by the proportions between the radius $R_1$ of the sun gear 4 and the radiuses $R_2$ of the satellites 6.

Generally, although the fan rotates slower than the turbine, the rotation speed $\omega_2$ of the satellite carrier 5 can be high, in the order of two thousand to four thousand revolutions per minute. Therefore, the centrifuge acceleration field created at the bearings 7 can be substantial, of in the order of one thousand G and even higher. The bearing 7 of a satellite rotating with the satellite carrier 5 is subjected to a load Ntot, comprising a centrifuge radial component.

Several technologies can be used for the bearings 7, such as, for example:
- hydrodynamic bearings or plain bearings;
- roller bearings with cylindrical rollers with several rows of rolling elements; or
- spherical roller bearings with one or more rows of rolling elements.

The example shown in FIG. 1 corresponds to bearings 7 with two rows of spherical roller bearings.

These technologies enable supporting the forces applied to the bearings 7, especially the load Ntot. However, the lubrication of these bearings, which is an essential point for the performances and the service life of the reduction gear, is affected by the centrifuge field.

If one considers in particular bearings with rotating elements, such as those in FIG. 1, the contacts of the roller bearings of the bearing 7 subjected to the load N see their maximum load in a radially inner area B of the bearing 7, i.e. located radially inside with respect to the longitudinal axis X of the satellite carrier 5. It is therefore essential to lubricate this area B correctly, this is the location of the bearing 7 that requires a maximum quantity of oil.

On the contrary, the centrifuge field, represented for example by the arrows G1 and G2, drives the lubrication oil present between the roller bearings radially outwards with respect to the longitudinal axis X, and tend to cause an accumulation of oil towards a radially outer area A of the bearing 7, opposite with respect to the longitudinal axis X.

There is thus a need to define a lubricating device of the bearing that allow to ensure a correct lubrication at the level of the radially inner area B of the bearing.

It is known from document FR 3 015 599 a lubrication circuit of a bearing provided on a mechanical device.

However, in particular in the field of turbomachines, it is important to obtain this result in such a way that there is an over-consumption of oil in order to correctly lubricate the radially inner area B with an oil that tends to accumulate in the area A. Indeed, the higher the flow rate of the oil is, the more the volume of oil on board and the size of the tank for the lubrication circuit are too, which has an unfavourable effect on the mass of the turbomachine.

Moreover, especially for the integration into an epicyclic reduction gearset, the lubrication device must be simple and, preferably, the supply with oil of the bearing on the satellite carrier must be done by simplifying the arrival of oil.

DESCRIPTION OF THE INVENTION

To this end, the invention relates to an assembly for an epicyclic reduction gearset, the assembly comprising a satellite carrier, satellites and at least one satellite bearing carried by the satellite carrier that is rotatable about an axis of rotation, said bearing comprising a central axis linked to the satellite carrier, an inner ring securely mounted on the central axis, an outer ring mounted to rotate around said central axis, and a lubrication circuit arranged to bring a flow of oil between said rings, said lubrication circuit comprising a first portion arranged to be supplied with oil from the satellite carrier at the central axis and comprising openings opening to the outside of the inner ring in a radially inner area of the bearing with respect to said axis of rotation, a second portion comprising openings opening to the outside of the inner ring in a radially outer area of the bearing with respect to said axis of rotation, and an intermediate portion comprising at least one channeling arranged to connect the first portion to the second portion, said at least one channeling comprising at least one singular pressure drop formed by an elbow or a sudden narrowing of the cross-section and at least one flattening of the transverse cross-section over a major portion of the length thereof or a path forming a detour between two ends of said channeling, the central axis comprising a radially outer first surface with respect to said central axis, and the inner ring comprising a radially inner second surface with respect to said central axis, said first and second surfaces being joined, said at least one communication channeling being formed by a groove applied in the first or the second surface.

It is known to the person skilled in the art to be able to give substantial values to the pressure drop of the circuit. Note that the pressure drop of a circuit is comprised of singular pressure drops (linked to a sudden variation such as an elbow or a restriction) and regular (or linear) pressure drops (linked to the friction of fluid on the walls of the channeling, these drops depending on the length, the roughness of the walls, the cross-section and the shape thereof). The detour, in the form of zigzags or loops, increases the length of the path travelled by the oil, the flattening increases the wetted perimeter, the two characteristics increase the friction of the oil on the walls of the channeling.

In this way, the carrying out of a communication channeling that combines a pressure drop with an increase in friction along the path thereof, makes it possible to obtain substantial pressure drops between the first portion and the second portion of the lubrication circuit. It is as such possible to easily adjust the distribution of the flow rates of lubricant sent between the radially inner and outer areas of the bearing, taking account of the centrifugal efforts.

Advantageously, a succession of several elbows makes it possible to create detours in the form of zigzags.

Moreover, a flattening of the transverse cross-section corresponds preferably to a ratio greater than two between substantially perpendicular transverse dimensions.

This embodiment allows to form the communication channeling on one of the two elements, without touching the other. In addition, the carrying out of a groove on a surface can be done via a milling operation by precisely controlling the shape of this groove.

Preferably, the first and second surfaces are cylindrical and plain.

Advantageously, the flattening of the transverse cross-section of said at least one channeling is obtained by applying in the first or the second surface, a groove of transverse cross-section corresponding substantially to an arc of a circle of which the radius of curvature is greater than half of the distance separating the edges of the groove on said first or second surface.

This embodiment of the groove makes it possible to easily maintain a constant cross-section of passage by increasing the radius of the circle in order to increase the wetted perimeter.

Advantageously, at least one of the first and second portions of the lubrication circuit comprises at least one channeling formed by a groove applied in the first or the second surface, communicating with a duct passing through the inner ring.

Even more advantageously, the first portion of the lubrication circuit comprises a substantially longitudinal duct, formed in said central axis and arranged to be supplied with lubricant at a first of its longitudinal ends, and at least one channeling formed by a groove applied in the first or the second surface, communicating with said duct by at least one outlet opening of the central axis.

The carrying out of the first and second portions of the lubrication circuit at the interface between the ring and the central axis allows to simplify the manufacture of the bearing.

Advantageously, the first portion of the lubrication circuit comprises at least two grooves in the first or the second surface, in planes that are substantially perpendicular to the axis of rotation, each communicating with openings passing through the inner ring.

Said at least one channeling of the intermediate portion of the lubrication circuit can be connected to one of said at least two grooves of the first portion of the lubrication circuit.

In a particular embodiment, the intermediate portion of the lubrication circuit comprises a single channeling that is connected to that of said at least two grooves of the first portion of the lubrication circuit which is the farthest away from said first longitudinal end of the longitudinal duct of the central axis.

The invention also relates to an assembly for an epicyclic reduction gearset, comprising a satellite carrier, satellites and bearings such as shown hereinabove between the satellites and the satellite carrier.

BRIEF DESCRIPTION OF THE FIGURES

This invention shall be better understood and other details, characteristics and advantages of this invention shall appear more clearly when reading the following description of a non-limiting example, in reference to the accompanying drawings whereon:

FIGS. 3a and 3b schematically show a first embodiment of a bearing according to the invention cut along a plane of symmetry in the centrifuge field;

FIGS. 4a and 4b schematically show a cross-section of an example of an oil duct between the axis and the inner ring of a bearing according to the invention with and without a flattening;

DESCRIPTION OF AN EMBODIMENT

Figure 1:
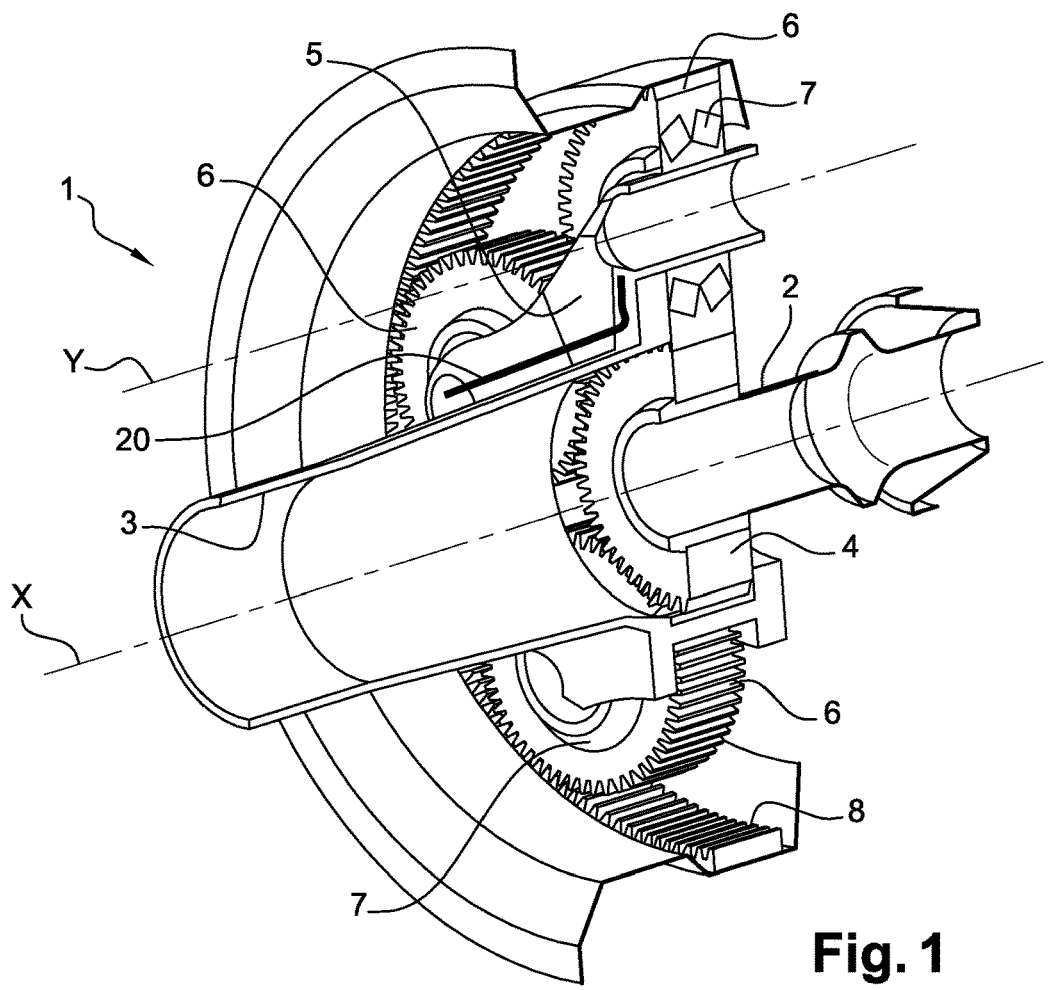
FIG. 1 shows an exploded view in perspective of an epicyclic reduction gearset comprising bearings according to the invention.
Figure 2:
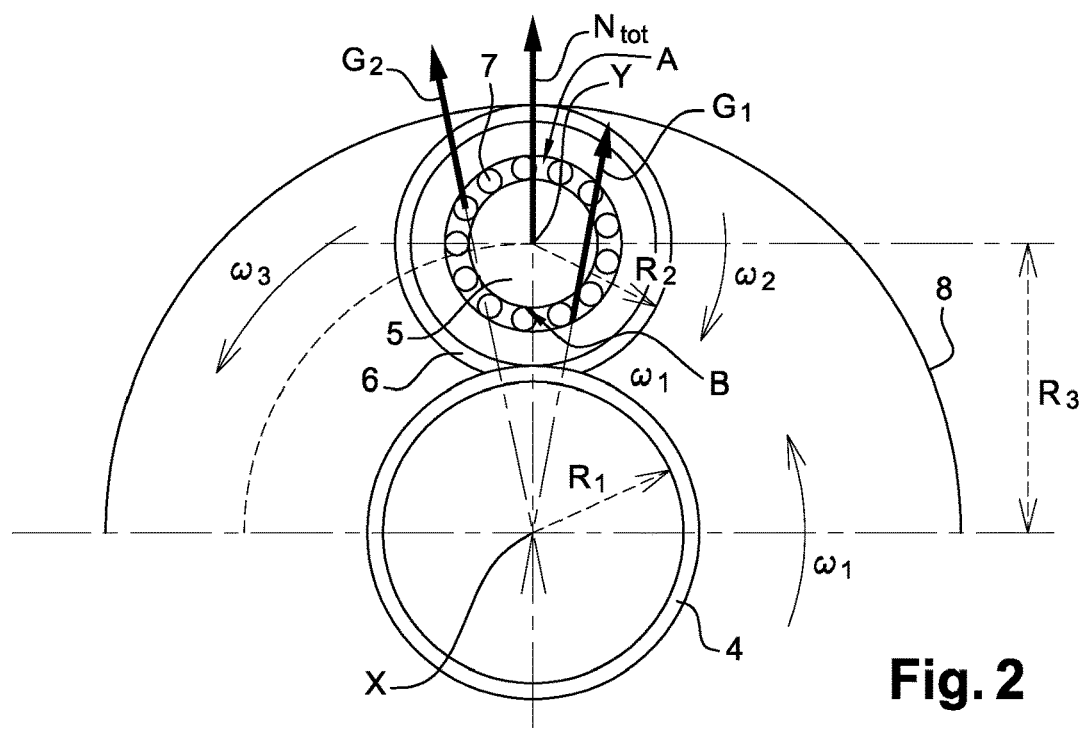
FIG. 2 schematically shows as a cross-section the conditions to be reproduced for the tests of a bearing used in a reduction gear such as the one of FIG. 1.

A bearing 7 according to the invention is, for example, used in a turbomachine reduction gear such as already shown hereinabove, in reference to FIGS. 1 and 2.

In reference to FIGS. 3a and 3b, a bearing 7 using a lubrication device according to the invention generally comprises the elements described hereinafter.

Inside, an axis 9 integral with the satellite carrier comprises a portion with a tubular shape, with a circular cross-section centred on the axis Y. For example, this axis can be integrally formed with a transversal portion of the satellite carrier 5 linking the axes of all of the bearings of the satellites. The axis 9 here comprises a plain and cylindrical outer surface 10 of diameter D1.

An inner ring 11 of the bearing is arranged about the axis 9 in such a way as to be integral therewith and not move in rotation. For example, the inner ring 11 comprises a cylindrical inner surface 12 that has a diameter substantially equal to the diameter D1 of the outer surface 10 of the axis 9, in such a way as to be able to adjust them tightly.

The outer surface of the inner ring 11 here comprises two tracks 13a and 13b for rolling elements 14, of which only one is schematically shown in FIG. 3b. The rolling elements 14 can have a spherical shape or a shape of small rollers or barrels. The tracks 13a and 13b have a revolution shape about the central line Y of the bearing 7. The longitudinal cross-section is suitable for the shape of the rolling elements 14. This cross-section can have a general direction that is slightly inclined with respect to the axis Y. A central crown 15 here separates the two tracks 13a and 13b. In addition, flanges are formed at each longitudinal end of the inner ring 11, in such a way as to longitudinally maintain the rolling elements.

An outer ring 16 of the bearing is arranged around the rolling elements 14, radially facing the inner ring 11 with respect to said central axis. The inner surface of the outer ring comprises here two tracks 17a and 17b for the rolling elements 14. The tracks 17a and 17b also have a revolution shape about the axis Y of the bearing 7. As a longitudinal cross-section, they here form a concave curve about the axis Y, centred around a radius passing longitudinally through the middle of the bearing 7. The two tracks 17a, 17b are here separated on this concave curve by a groove 18, positioned facing the central crown 15.

The tracks 17a and 17b are conformed to allow the rolling of rolling elements 14 and, as such, allow the outer ring 16 to rotate around the inner ring 11 and the axis 9 of the bearing. Moreover, the concave shape of the tracks 17a and 17b longitudinally maintains the outer ring 16 in position facing the inner ring 11.

Finally, the outer ring 16 is maintained integral by any means known to the person skilled in the art with the gear wheel 19 of the satellite 6, in such a way as to ensure the rotation of the satellite 6 about the axis 9. The outer ring 16 can be tightly adjusted for example in this gear wheel of the satellite 6.

A lubrication circuit for an epicyclic reduction gearset such as the one which was described generally comprises an oil tank, a first channeling system with one or more pumps to send the oil to the reduction gear, an enclosure for recovering the oil that has lubricated the reduction gear and a second channeling system with one or more pumps for returning the oil to the tank. These elements, known to the person skilled in the art, are not shown.

At the level of the reduction gear, a third channeling system, integral with the satellite carrier 5 carries the oil coming from the tank especially to the bearings 7. In FIG. 1, this channeling system is schematically shown by a duct 20. The other portions of this third channeling circuit are not shown, nor the means that make it possible to transfer the oil coming from the first circuit to the referential in rotation of the satellite carrier 5.

An embodiment of the portion of the lubrication circuit proper to the bearing 7 is here detailed in three parts, in reference to FIGS. 3a and 3b. The first portion is located in a radially inner area B of the bearing 7 with respect to the axis X of the satellite carrier. It is, first of all, formed by a substantially rectilinear longitudinal duct 21, carved inside the wall of the axis 9 of the bearing 7 substantially in a median plane P with respect to the axis X of the satellite carrier 5.

The duct 21 opens onto a transversal wall in such a way as to be connected to the duct 20 of the third channeling system mentioned hereinabove. Note that in this example, the third channeling system has only one single duct 20 for bringing oil to the bearing 7, for the simplicity of integration, and said duct 20 opens onto the axis 9 at the radially inner area B.

The duct 21 is closed at its opposite longitudinal end. However, here three openings 22a, 22b, 22c radially pass through the wall of the axis 9 towards the outside of the duct 21 towards the outer surface 10 of the axis 9. An opening 22c opens at the central crown 14 of the inner ring 11. The other openings 22a, 22b open at the opposite longitudinal ends of the two tracks 13a, 13b of the inner ring 11.

The first portion of the circuit portion also comprises three grooves 23a, 23b, 23c carved in the inner surface 12 of the inner ring 1 according to a plane perpendicular to the axis Y of the bearing 7. Each groove 23a, 23b, 23c extends over an angular sector centred on the radially inner area B, not rising beyond 90 degrees with respect to a plane passing through the longitudinal axis X. Each groove 23a, 23b, 23c is longitudinally positioned facing the opening of an opening 22a, 22b, 22c on the outer surface 10 of the axis 9.

As the outer surface 10 of the axis 9 and the inner surface 12 of the inner ring 11 are plain and adjusted, the grooves 23a, 23b, 23c form ducts at the interface between the axis 9 and the inner ring 1, which communicate with the bringing of oil 20.

Moreover, one or more ducts 24 distributed over the circumferential extension of each groove 23a, 23b, 23c substantially radially pass through the inner ring 11. The ducts 24 corresponding to the central groove 23c open on either side of the central crown 5 at the inside longitudinal end of the tracks 13a, 13b of the ring 11. The ducts 24 corresponding to the two other grooves 23a, 23b open at the outer longitudinal ends of the tracks 13a, 13b.

In the example shown, the groove 23b on the side opposite the bringing of oil 20 extends over an angular sector that is very small and even zero and is positioned in the vicinity of the closed longitudinal end of the duct 21.

As such, in this first circuit portion, the oil coming from the supply duct 20 is carried to the roller bearings 14 at the radially inner area B.

It is within the practice of the person skilled in the art to dimension, for example with digital or mechanical simulations of fluids, the various elements of this first portion, the longitudinal duct 21, the openings 22a, 22b, 22c, the grooves 23a, 23b, 23c and the ducts 24, so that the oil is distributed in a balanced manner longitudinally in the radially inner area B and with a flow rate that is sufficient to lubricate the roller bearings 14. The flow rate of oil arriving as such by this first portion can be drained away through the opening of the longitudinal ends of the volume containing the rolling elements 14, as indicated by the arrow 101 in FIG. 3b.

A portion of the oil can also be driven circumferentially by the operation of the bearing in rotation. It appears however that this is not sufficient to bring the oil required for the lubrication of the roller bearings at the radially outer area A with respect to the axis X of the satellite carrier or that this would correspond to a needlessly high flow rate of oil to pass at the radially inner area B.

For these reasons, the first circuit portion that has just been described is advantageously dimensioned to allow to pass a flow rate that is suitable for the lubrication in the radially inner area B and the lubrication circuit in the bearing comprises a second portion dimensioned in order to allow to pass the flow rate of oil suitable for the lubrication of the roller bearings at the radially outer area A, with an intermediate portion for supplying with oil the second portion from the first portion.

The second portion of the lubrication circuit in the bearing 7 will now be described. In the example shown, this second portion comprises a groove 25 carved in the inner surface 12 of the inner ring 11 along a plane perpendicular to the axis Y of the bearing 7. The groove 25 extends over an angular sector centred around the radially outer area A, not descending beyond 90 degrees around a plane passing through the longitudinal axis X. The groove 25 is positioned longitudinally between the two tracks 13a and 13b, on the central crown 15.

Moreover, one or more ducts 26 distributed over the circumferential extension of the groove 25 substantially radially pass through the inner ring 11. The ducts 26 open on either side of the central crown 15 at the inside longitudinal end of the tracks 13a, 13b of the ring 11.

Here, this configuration has been deemed as sufficient to provide the flow rate required for the lubrication of the bearings at the radially outer area A. However, alternatives can be considered by using several grooves, in a way that can be compared to what is done at the radially inner area B.

In a manner that is comparable to what exists on the radially inner area B, the groove 25 forms a duct at the interface between the axis 9 and the inner ring 11, which can supply with oil the ducts 26 passing through the inner ring 11.

The intermediate portion of the circuit, designed to bring the oil to the groove 25 in the radially outer area A from the first portion, here comprises a transversal duct 27 extending over an arc of circle connected to an end of the groove 23c that is the farthest away from the open longitudinal end of the duct 21 for bringing oil and after the last duct 24 on said groove 23c passing through the inner ring 11.

The transversal duct 27 then communicates with the groove 25 of the second portion via a longitudinal duct 28 extending into a median plane of the satellite carrier, at the radially outer area A.

Advantageously, the transversal duct 27 and the longitudinal duct 28 are also formed at the interface between the axis 9 and the inner ring 11 by corresponding grooves 27, 28, carved in the inner surface 12 of the inner ring 11. The outer surface 10 of the axis 9 is plain at this location.

According to the invention, in a first alternative embodiment, the groove 27 is carved in such a way that the corresponding duct forms at least one, generally more, sudden elbows, such as is shown by the zigzag line in the FIGS. 3a and 3b.

The elbow or elbows form one or more singular pressure drops in the intermediate portion which make it possible to prevent the strong centrifuge field G to which the oil is subjected to in the lubrication circuit from drying out the first portion of the circuit. In addition, the presence of elbows 30 creates one or more zigzags in the path of the channeling 27, increasing as such the length thereof and the pressure drops via friction along the inner walls thereof. Via known methods, the person skilled in the art can, as such, define the angles of elbows and their distribution on the duct 27 in order to adapt the pressure drop to the centrifugal forces in the reduction gear in operation in such a way as to balance the flow rates of oil between the first and the second portion of the circuit in the bearing 7.

The zigzags form detours in the path of the channeling 27, in the sense that the path moves away from the shortest curve in order to join its two ends. In an alternative not shown, an elbow can be followed by one or more loops following the interface between the central axis 9 and the inner ring 11. These loops form detours that extend the path travelled by the oil in the channeling 27, and thus the pressure drops via friction along the walls.

In this way, a suitable flow of oil is sent both at the radially inner area B and the radially outer area A, in order to correctly but not excessively lubricate the roller bearings over the entire circumference of the bearing 7. As indicated by the arrows 101 and 102, the oil is then removed from the bearing 7 by the openings at the longitudinal ends of the volume containing the rolling elements between the inner 11 and outer 16 rings.

Figure 5:
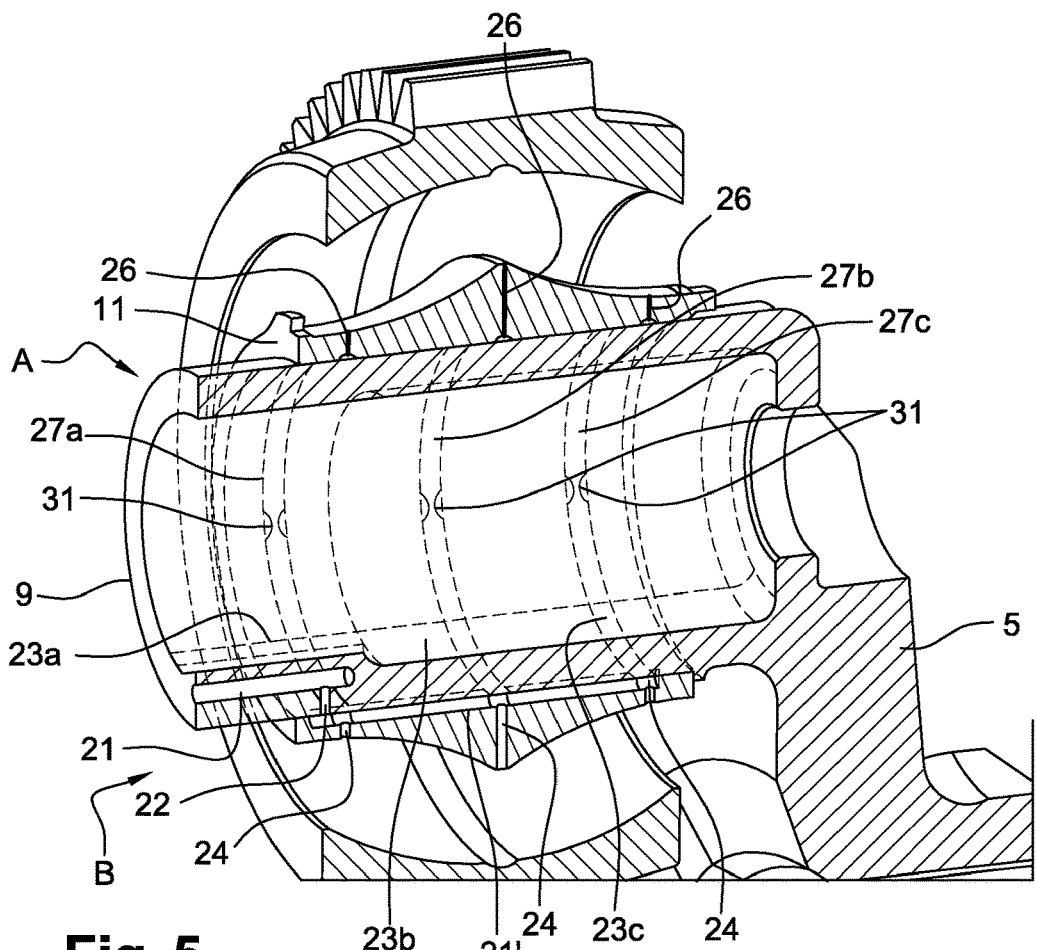
FIG. 5 shows a second embodiment of a bearing, according to the invention, cut along a plane of symmetry in the centrifuge field.
Figure 6:
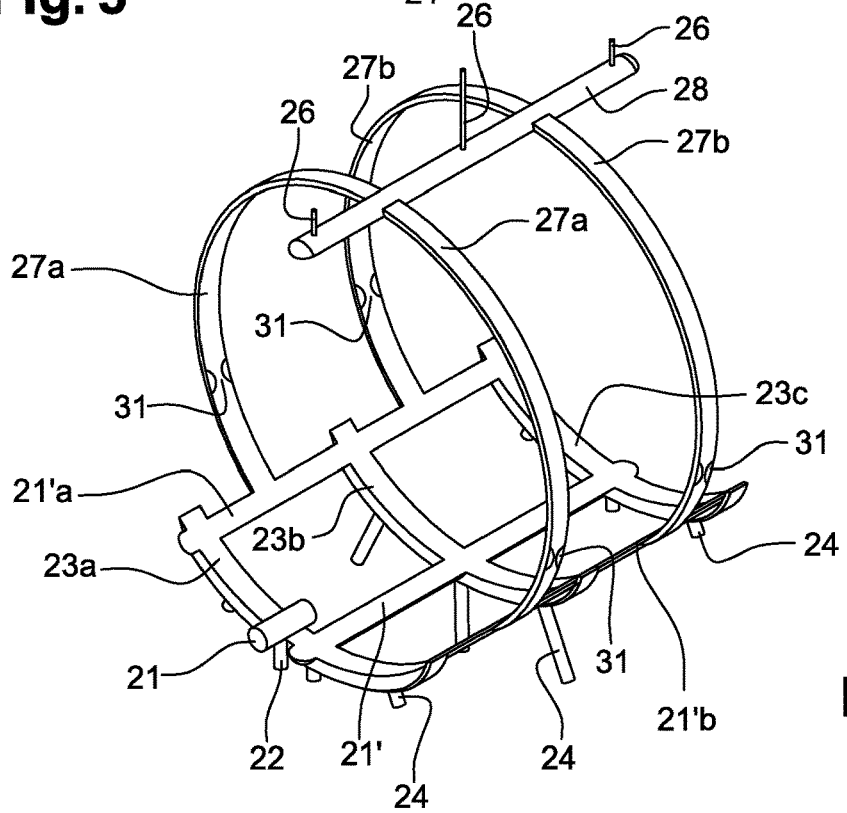
FIG. 6 shows in perspective the skeleton of a lubrication circuit of a third embodiment of a bearing according to the invention.

According to another alternative embodiment, not shown in FIGS. 3a and 3b but indicated in FIGS. 5 and 6 which are discussed further on, singular pressure drops can also be created by creating one or more sudden narrowings 31 of the channeling 27.

Furthermore, in order to increase the friction outside of the singular pressure drops, the transverse cross-section of the channeling 27 can be greatly flattened. This creates an increase in the wetted perimeter with respect to a round cross-section, which substantially increases the friction surface.

In reference to FIGS. 4a and 4b, a very substantial increase in the wetted perimeter while still retaining a cross-section of passage suitable for the desired flow rate can be created by adjusting the shape of the groove that forms the channeling 27.

FIG. 4a shows a cross-section of a groove 27 that has, for example, a semi-circular shape. The area of the half-circle centred on the surface 12 corresponds here to a given cross-section of passage SP, suitable for the flow rate desired. The pressure drop over a segment of duct that has this cross-section is substantially proportional to the wetted perimeter, here the sum of the lengths of the half-circle and of its diameter.

By forming the groove 27, as indicated in FIG. 4b, with a circle with a larger diameter but with a centre farther away from the surface 12, as such increasing the ratio between the distance between the edges of the groove 27 and the depth thereof to a value greater than two, it is possible to obtain the same value of the cross-section of passage SP but with a more substantial wetted perimeter. It is therefore possible to substantially increase the friction along the channeling by flattening it and by preserving a value of the cross-section of passage suitable for the flow rate of oil that has to be passed.

A combination of the alternatives, for example of the elbows with a flattening of the cross-section of passage, can also be considered.

Moreover, the longitudinal duct 26 of the intermediate portion can also have singular pressure drops.

With regards to carrying out the lubrication circuit in the bearing, note that the embodiment shown is easy to carry out. The longitudinal duct 21 and the transversal openings 22a, 22b, 22c in the axis 9, as well as the transversal ducts 24, 26 in the inner ring 11 can be formed by boring. The grooves 23a, 23b, 23c, 25, 26, 27 can be carried out by milling. This technique makes it possible, especially, to check the shape carved in order to create the singular pressure drops.

Also note that the example of lubrication circuit in the bearing 7 was shown with grooves carved in the inner wall 12 of the inner ring 11 but with a possible alternative, in order to form ducts at the interface between the inner ring 11 and the axis 9 consists in using grooves carved in the outer surface 10 of the axis 9, by not machining the plain inner surface 12 of the inner ring. It is also noted that it is simpler to machine, for example, the channeling 27 in the outer surface of the central axis 9 than on that of the inner ring. An external machining is simpler to carry out than an internal machining.

Other embodiments of the architecture of the lubrication circuit can also be integrated into the invention.

FIG. 5 shows a second embodiment of the lubrication circuit. In this second example, the longitudinal duct 21 carved in the central axis 9 has a reduced longitudinal extension. It stops substantially at the first transversal groove 23a of the first portion of the lubrication circuit and supplies, via a single through-duct 22, a longitudinal groove 21' carved at the interface between the inner ring 11 and the central axis 9. It is this longitudinal groove 21' that supplies with oil the three transversal grooves 23a, 23b, 23c connected to the ducts 24 passing through the inner ring 11 in the radially inner area B.

The second portion of the lubrication circuit comprises three openings 26 passing through the inner ring 11 in the radially outer area A with respect to the axis of the satellite carrier 5, and positioned transversally substantially facing transversal grooves 23a, 23b, 23c of the first portion.

Here, the intermediate portion is comprised of two times three grooves 27a, 27b, 27c, arranged on either side of the longitudinal groove 21' of the first portion and connecting each transversal groove 23a, 23b, 23c of the first portion to an opening 26 of the second portion passing through the inner ring.

As indicated schematically in FIG. 6, according to the invention, for example, one or more sudden narrowings 31 are installed on each groove and this is associated with a flattened cross-section of the groove.

From a carrying out standpoint, the assembly of the circuit, after the longitudinal duct 21, can be formed on the surface of the internal periphery of the inner ring 11, by carving a longitudinal supply groove for the first portion and three circular grooves with a suitable flattening, whereon restrictions of cross-section are placed between the through-openings 24 of the radially inner area B and those 26 of the radially outer area A.

FIG. 6 shows a third example of architecture of the lubrication circuit.

In relation to the preceding example, the first portion comprises two additional longitudinal grooves 21'a, 21'b in the radially inner area B, connecting the transversal grooves 23a, 23b, 23c on either side of the central groove 21'.

The second portion comprises, on its side, a longitudinal groove 28 connecting the three through-openings 26.

The intermediate portion comprises two transversal grooves 27a, 27b on each side, connecting the lateral longitudinal grooves 21'a, 21'b of the radially inner area B to the central longitudinal groove of the radially outer area. Here, each one of the transversal grooves 27a, 27b of the intermediate portion is processed according to the invention, either by carrying out at least one zigzag with an elbow (alternative not shown), or by placing at least one sudden variation of cross-section 31, associated with a flattening of the transverse cross-section over a major portion of the length thereof.

The invention claimed is:

1. Assembly for an epicyclic reduction gearset, the assembly comprising a satellite carrier, satellites and at least one satellite bearing carried by the satellite carrier that is rotatable about an axis of rotation (X), said bearing comprising a central axis, an inner ring securely mounted on the central axis, an outer ring mounted to rotate around said central axis, and a lubrication circuit arranged to bring a flow of oil between said inner and outer rings, said lubrication circuit comprising a first portion arranged to be supplied with oil from the satellite carrier at the central axis and comprising openings opening to the outside of the inner ring in a radially inner area (B) of the bearing with respect to said axis of rotation (X), a second portion comprising openings opening to the outside of the inner ring in a radially outer area (A) of the bearing with respect to said axis of rotation (X), and an intermediate portion comprising at least one channeling arranged to connect the first portion to the second portion, said at least one channeling comprising at least one singular pressure drop formed by an elbow or a sudden narrowing of a cross-section and at least one flattening of a transverse cross-section over a major portion of the length thereof or a path forming a detour, wherein the central axis is linked to the satellite carrier and comprising a radially outer first surface with respect to said central axis, and the inner ring comprising a radially inner second surface with respect to said central axis, said first and second surfaces being joined, said at least one channeling being formed by a groove applied in the first or the second surface.

2. Assembly according to claim 1, wherein the first and second surfaces are cylindrical and plain.

3. Assembly according to claim 1, wherein the flattening of the transverse cross-section of said at least one channeling is obtained by applying in the first or the second surface, the groove corresponding substantially to an arc of a circle of which the radius of curvature is greater than half of the distance separating the edges of the groove on said first or second surface.

4. Assembly according to claim 1, wherein at least one of the first and second portions of the lubrication circuit comprises said at least one channeling formed by the groove applied in the first or the second surface, communicating with at least one duct passing through the inner ring.

5. Assembly according to claim 4, wherein the first portion of the lubrication circuit comprises said duct which extends substantially along a longitudinal axis, formed in said central axis and arranged to be supplied with lubricant at a first of its longitudinal ends, and wherein said at least one channeling formed by the groove applied in the first or the second surface, communicating with said duct by at least one outlet opening of the central axis.

6. Assembly according to claim 5, wherein the first portion of the lubrication circuit comprises at least two grooves in the first or the second surface, in planes that are substantially perpendicular to the axis of rotation (X), each communicating with one opening of said openings passing through the inner ring.

7. Assembly according claim 6, wherein said at least one channeling of the intermediate portion of the lubrication circuit is connected to at least one of said two grooves of the first portion of the lubrication circuit.

8. Assembly according to claim 7, wherein said at least one channeling comprising a channeling in the intermediate portion of the lubrication circuit, said single channeling is connected to that of said at least two grooves of the first portion of the lubrication circuit which is the farthest away from said first longitudinal end of the longitudinal duct of the central axis.

* * * * *